United States Patent Office 3,483,470
Patented Dec. 9, 1969

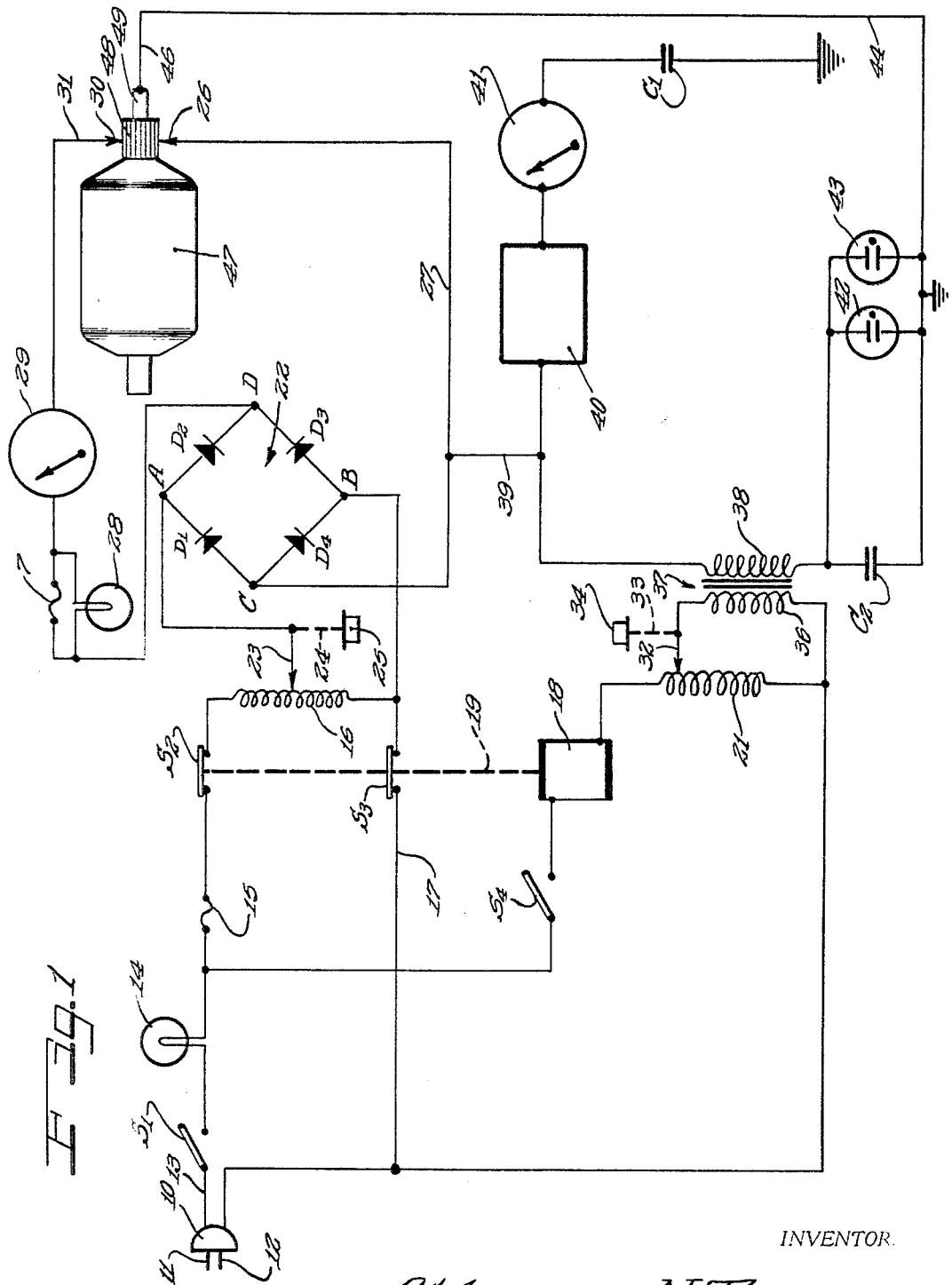

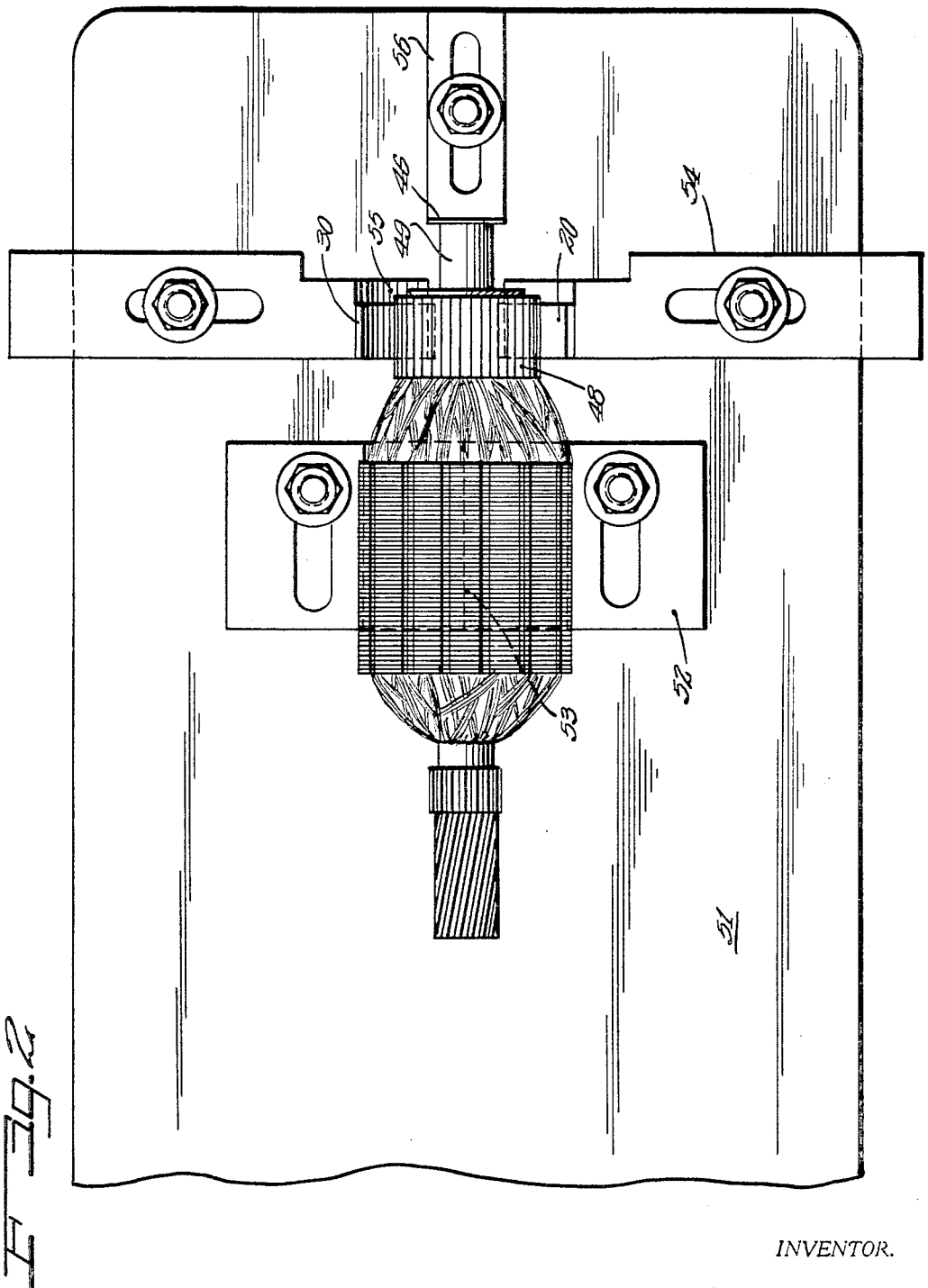

3,483,470
APPARATUS FOR TESTING ARMATURES FOR COIL CONDITION, SHORTS OR LEAKAGE
Athanase N. Tsergas, Des Plaines, Ill., assignor to Ram Tool Corporation, Chicago, Ill., a corporation of Illinois
Filed Nov. 3, 1967, Ser. No. 680,495
Int. Cl. G01r 3/00, 31/00, 15/12
U.S. Cl. 324—158
8 Claims

ABSTRACT OF THE DISCLOSURE

This invention discloses a tester for the armature of an electrical rotating machine to determine whether the armature has any open coils or any short circuits or leaks. The tester operates at operating voltage and at a voltage many times higher than the standard voltage to enable the sequential performance of the respective tests.

DESCRIPTION OF THE INVENTION

This invention relates in general to a testing device and in particular to an armature tester for testing the armature of an electrical machine at high voltage and also at operating potential.

The invention relates to an improved testing device with a fixture which will accurately indicate open coils, broken leads, and reversed leads in an armature.

It is an object of the present invention, therefore, to provide a novel armature testing apparatus in which the armature of rotating electrical machinery may be tested for broken leads, reverse leads, and shorts.

Another object of this invention is to provide an inexpensive testing device capable of testing an armature winding at both operating voltage and at a voltage much higher than the normal operating voltage.

A feature of the invention is found in the provision for a circuit and fixture for connecting an operating voltage to the armature coils of an armature of rotating machinery. An indicator monitors the voltage across the armature coils as the armature is rotated either automatically or manually so as to indicate whether the field coils of the device are operative. In a second phase of the test the operating voltage is disconnected from the field coils of the armature and a relatively higher potential is connected between the armature and ground to test for leakage or shorts.

Further features, objects and advantages of this invention will become apparent from the following description and claims when read in view of the drawings in which:

FIGURE 1 is a schematic diagram of the novel armature testing device of this invention; and FIGURE 2 is a perspective view of the armature supporting board.

FIGURE 1 illustrates a power plug 10 which has prongs 11 and 12 for inserting into a conventional power outlet. Prong 11 is connected to a lead 13 which is connected to an on-off-switch $S_1$. A power on indicator light 14 is connected in series with the switch $S_1$ and connects to a fuse 15. A variac 16 is connected from one side of the fuse to the other side of the power supply to prong 12 by lead 17. A pair of switches $S_2$ and $S_3$ are connected in series on either side of variac 16 and are controlled by mechanical actuator 19 of relay 18. The relay 18 has one side connected to a variac 21 and the other side is connected to the normally open contact of a switch $S_4$. The movable contact of the switch $S_4$ is connected to a point between light 14 and fuse 15. The other side of the variac 21 is connected to lead 17.

A bridge circuit 22 comprising diodes $D_1$, $D_2$, $D_3$ and $D_4$ are connected in a standard bridge arrangement and has point A between diodes $D_1$ and $D_2$ connected to the slide contact 23 of variactor 16. A shaft 24 controls slide contact 23 and a knob 25 is mounted on the shaft 24.

Point B of the bridge between diodes $D_3$ and $D_4$ is connected to the lead 17 through the switch $S_3$.

Point C between diodes $D_1$ and $D_4$ is connected to a wiper contact 26 by lead 27.

Point D between diodes $D_2$ and $D_3$ is connected to a fuse 7. An indicator light 28 is connected across the fuse 7.

An ammeter 29 is connected in series with the fuse 7 and light 28 and has its other side connected to a wiper contact 30 by lead 31.

The variac 21 has a wiper contact 32 that may be controlled by shaft 33 which carries knob 34. The primary 36 of a transformer 37 is connected between wiper contact 32 and the other side of the variac 21. The secondary 38 of the transformer 37 has one side connected by lead 39 to point C. Lead 39 is also connected to a multiplier 40 which is connected to a high voltage meter 41 which is in series with a condenser $C_1$ that has its opposite side connected to ground.

The other side of the secondary 38 is connected to ground through the parallel combination of condenser $C_2$, and neon bulbs 42 and 43.

A lead 44 is connected between ground and a wiper contact 46.

The armature of the rotating machinery to be tested is designated generally as 47 and has a commutator portion 48 which is formed with a plurality of electrically conducting commutators insulated from each other and which has windings which extend from one commutator to another commutator located circumferentially around the commutator. The motor shaft 49 is electrically insulated from the commutator and the windings and is engaged by the wiper contact 46.

FIGURE 2 shows in greater detail the testing fixture which supports the motor armature 47. The fixture comprises a base plate 51 of insulating material which has mounted thereon a V-block 52 formed with a central groove 53 in which the armature 47 rests. A second relatively smaller insulating block 54 is formed with a V-groove 55 in which the wiper contacts 30 and 26 are mounted. The shape and size of the "Vs" 53 and 55 formed in blocks 52 and 54 respectively, are such that they accommodate the particular size armature being tested, as shown in the drawing. The wiper contact 46 is mounted on an insulated support member 56 and engages the motor shaft 49 as shown.

In operation, an armature to be tested is placed in the fixture of FIGURE 2 such that various segments of the commutator engage the wiper contacts 26 and 30. The switch $S_4$ is opened and switch $S_1$ is closed. When the switch $S_1$ is closed, power will be fed to the indicator light 14 and to the variac 16 through the normally closed switches $S_2$ and $S_3$. The rectifier bridge 22 will convert an alternating voltage to a DC voltage and will apply it through the fuse 7 and meter 29 to wiper contacts 26 and 30. The wiper contacts 26 and 30 are connected to opposite end of a particular winding on the armature 47 through the commutator. For example, if the voltage across points C to D of the bridge is 50 voltages, approximately 5 amperes will be indicated by the ammeter 29 with a particular size armature.

If a shorted coil exists in the winding the current into the winding of the armature will go much above 5 amperes and this will blow the fuse 7. When this occurs, the indicator light 28 goes on to show that a faulty coil has been located in the armature. The operator will, in this event, reject the armature as being defective.

In some instances, a winding may be reversed. If this occurs, a fluctuation in the normal indication of the meter 29 will occur. Thus, with an open coil or a broken lead, zero current will pass through the meter 29 and the meter will indicate zero. If a lead is reversed in the coil the needle will move from its normal indication downwardly. If the armature is a good one, the meter 29 will vary only a small amount as, for example, zero to one amphere as the armature is rotated.

The operator may rotate the shaft of the armature of the motor 47 manually or this may be done by a suitable driving means, if desired.

After the motor has been rotated 360° while the normal operating voltage is applied, the switch $S_4$ is closed to apply a high voltage test. The Switch $S_4$ energizes relay 18 which opens switches $S_2$ and $S_3$ to disconnect the low voltage test apparatus from the power supply.

A relatively high voltage as, for example, 1000 volts, is applied to the lead 39 to wiper contact 26. If any short circuit exists between any of the windings of the armature and the armature shaft, lights 42 and 43 will come on. A direct short from the armature coils to the shaft 49 will ignite both neon lights 42 and 43. If a direct short does not exist, but there is leakage between the coils to the shaft, only one of the lights 42, 43 will be ignited. The armature is rotated 360° to check all of the coils.

If the armature under test passes both the low and high voltage tests, the operator knows that it is good and it will be passed. If the armature fails to pass either of the tests it will be rejected and sent back for rework.

It is seen that this invention provides a novel armature tester which quickly and simply allows an armature to be tested at low operating voltage and also for high voltage leaks and shorts. The apparatus is constructed so that the operator is protected and it is usable by relatively inexperienced operators.

Although the invention has been described with respect to a preferred embodiment, it is not to be so limited as changes and modifications may be made therein which are within the full intended scope as defined by the appended claims.

I claim as my invention:

1. Apparatus for testing an armature having a commutator of a rotating electrical machine comprising, a test table for receiving the armature thereon, means on said test table including first, second and third contacts for engaging said armature, the first and second contacts engaging the commutator to complete a circuit through a particular coil of the winding of the armature and to complete the circuit through all of the coils of the winding as the armature is rotated, and the third contact engaging the shaft of the armature, means connectable to a source of power and having first and second output means for providing a first operating potential and a second higher operating potential respectively, first circuit means connected between said first output means and said first and second contacts for determining the condition of the armature winding, said first circuit means including a rectifier connected to said first output means and a direct current ammeter connected between the rectifier and the first and second contacts, and second circuit means connected between said second output means and said first and third contacts for detecting the presence of shorts or leakage between the armature winding and shaft, said second circuit means including a neon bulb indicator and a condenser shunting said neon bulb indicator, and switch means for selectively enabling the energization of said first or second output means in accordance with the partcular test to be performed.

2. Apparatus according to claim 1 wherein a fuse is connected in circuit with the ammeter and the rectifier, and an indicator is connected across the fuse to indicate when the fuse is out.

3. Apparatus according to claim 1 wherein the first output means includes adjusting means for varying the magnitude of the first operating potential.

4. Apparatus according to claim 3 wherein the adjusting means is a variac.

5. Apparatus according to claim 1 wherein the second output means includes adjusting means for varying the magnitude of the second operating potential.

6. Apparatus according to claim 5 wherein said adjusting means for varying the magnitude of the second operating potential comprises a variac.

7. Apparatus according to claim 1 wherein the neon bulb indicator comprises a pair of neon bulbs connected in parallel.

8. Apparatus according to claim 1 wherein said switch means comprises a switch connected in circuit with the first output means and a relay connected in circuit with the second output means for actuating said switch.

References Cited

UNITED STATES PATENTS 2,755,435  7/1956  Schiedel _____ 324—51
3,098,917  7/1963  Williams.

RUDOLPH V. ROLINEC, Primary Examiner

E. L. STOLARUN, Assistant Examiner